(12) United States Patent
Kamii

(10) Patent No.: US 9,441,841 B2
(45) Date of Patent: Sep. 13, 2016

(54) COOKING DEVICE

(75) Inventor: Yasuhiko Kamii, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 234 days.

(21) Appl. No.: 14/237,783

(22) PCT Filed: Aug. 2, 2012

(86) PCT No.: PCT/JP2012/069686
§ 371 (c)(1),
(2), (4) Date: Feb. 7, 2014

(87) PCT Pub. No.: WO2013/021905
PCT Pub. Date: Feb. 14, 2013

(65) Prior Publication Data
US 2014/0196612 A1  Jul. 17, 2014

(30) Foreign Application Priority Data

Aug. 8, 2011  (JP) ................. 2011-172628

(51) Int. Cl.
*A47J 27/04*  (2006.01)
*H05B 6/64*  (2006.01)
*F24C 7/02*  (2006.01)
*A21B 1/26*  (2006.01)
*F24C 15/32*  (2006.01)
*F24C 15/02*  (2006.01)

(52) U.S. Cl.
CPC . *F24C 7/02* (2013.01); *A21B 1/26* (2013.01); *F24C 15/025* (2013.01); *F24C 15/322* (2013.01); *H05B 6/6473* (2013.01)

(58) Field of Classification Search
CPC ...... F24C 15/322; F24C 15/325; A21B 1/26; H05B 6/6485; H05B 6/6473; H05B 6/642

USPC ......... 99/476, 474; 219/681, 682, 757, 400; 126/21 A, 20, 273.5
See application file for complete search history.

(56) References Cited

U.S. PATENT DOCUMENTS

| 4,115,678 | A | * | 9/1978 | Tachikawa | .......... H05B 6/6411 |
| | | | | | 126/21 A |
| 4,491,065 | A | * | 1/1985 | Poulson | ............... F24C 15/325 |
| | | | | | 126/21 A |
| 4,547,642 | A | * | 10/1985 | Smith | .................... F24C 14/00 |
| | | | | | 126/21 A |
| 4,743,728 | A | | 5/1988 | Nagafusa et al. | |

(Continued)

FOREIGN PATENT DOCUMENTS

JP  57-30620 U  2/1982
JP  4-260726 A  9/1992

(Continued)

*Primary Examiner* — Reginald L Alexander
(74) *Attorney, Agent, or Firm* — Birch, Stewart, Kolasch & Birch, LLP

(57) ABSTRACT

A door is pivotably coupled to a lower portion or an upper portion on the front side of a box so as to be opened vertically to an opening. A gap having a predetermined space is present at the lower portion or at the upper portion between the box and the door with the door closed. The box has an aperture section on the side for introducing outside air blown by an air blower mechanism into a heating chamber. The aperture section is positioned adjacent to the gap on a side surface of the heating chamber. The outside air introduced into the heating chamber through the aperture section moves so as to traverse the opening to block vapor produced from an object being cooked by heating with a heating device from leaking through the gap to the outside of the heating chamber.

4 Claims, 4 Drawing Sheets

(56) References Cited

U.S. PATENT DOCUMENTS 5,204,503 A * 4/1993 Maiellano, Jr. .......... F24C 7/06
 219/400
6,849,840 B2 * 2/2005 Sung ................... H05B 6/642
 126/21 A

FOREIGN PATENT DOCUMENTS

| JP | 7-101099 B2 | 11/1995 |
| JP | 2000-274693 A | 10/2000 |
| JP | 3619955 B2 | 2/2005 |

* cited by examiner

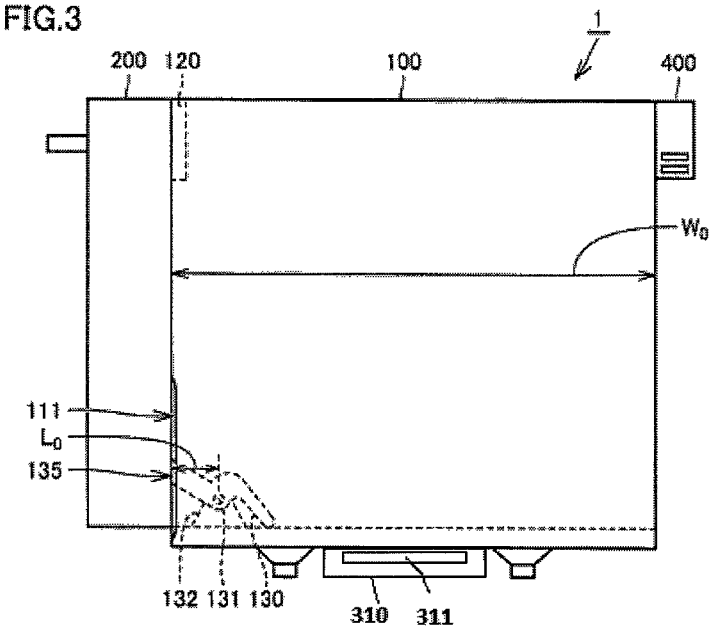
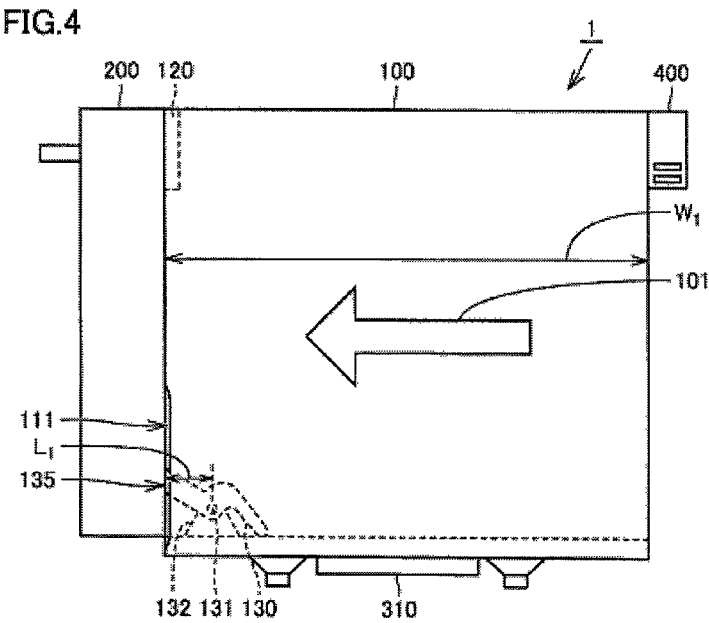

COOKING DEVICE

TECHNICAL FIELD

The present invention relates to a cooking device.

BACKGROUND ART

Japanese Patent Laying-Open No. 2000-274693 (Patent Document 1) is a prior art document that discloses a cooking device having a uniform gap between a box and a door to communicatively connect the outside of a heating chamber with the inside of the heating chamber when the door for opening/closing the heating chamber is closed.

In the cooking device described in Patent Document 1, when high-frequency heating is started, an exhaust fan motor is driven to reduce the atmospheric pressure in the heating chamber, causing outside air to be sucked into the heating chamber through the gap. Due to the sucked outside air, a large amount of vapor produced by high-frequency heating from the object being cooked in the heating chamber cannot come close to the door on the front of the heating chamber. As a result, fogging of the sight glass on the door is prevented.

CITATION LIST

Patent Document

PTD 1: Japanese Patent Laying-Open No. 2000-274693

SUMMARY OF INVENTION

Technical Problem

The heating chamber is not always under negative pressure in some evacuation states. When a gap is provided between the box and the door, vapor produced from the heated object may leak through the gap to the outside of the heating chamber. The vapor leakage condenses around the periphery of the cooking device to cause contamination or corrosion.

The present invention is made in view of the foregoing problem. An object of the present invention is to provide a cooking device capable of reducing leakage of vapor produced from an object being cooked through a gap between a box and a door, and condensation of the vapor on the inside of the door.

Solution to Problem

A cooking device based on the present invention includes a box having an opening on a front thereof, a heating chamber provided in the box and inside which an object to be cooked is placed through the opening, a door for opening and closing the opening, a heating device for heating the object in the heating chamber, and an air blower mechanism provided in the box for blowing outside air to the periphery of the heating chamber for cooling. The door is pivotably coupled to a lower portion or an upper portion on a front side of the box so as to be opened vertically to the opening. A gap having a predetermined space is present at the lower portion or at the upper portion between the box and the door with the door closed. The box has an aperture section on a side thereof for introducing the outside air blown by the air blower mechanism into the heating chamber. The aperture section is positioned adjacent to the gap on a side surface of the heating chamber. The outside air introduced into the heating chamber through the aperture section moves so as to traverse the opening to block vapor produced from the object by heating with the heating device from leaking through the gap to outside of the heating chamber.

Preferably, the gap has the predetermined space larger than a length of thermal expansion of the box caused by heating with the heating device.

According to an embodiment of the present invention, the air blower mechanism includes a fan for blowing outside air and a deflector for deflecting the outside air blown from the fan. The deflector has such a shape that deflects the outside air blown by the fan to the upper portion or the lower portion of the box toward the side of the box and guides the outside air to the aperture section.

According to an embodiment of the present invention, the cooking device is of a built-in type that is used such that the box is installed with its periphery covered.

Advantageous Effects of Invention

The present invention can reduce leakage of vapor produced from an object being cooked through the gap between the box and the door, and condensation of the vapor on the inside of the door.

BRIEF DESCRIPTION OF DRAWINGS

FIG. 3 shows the cooking device in FIG. 1 as viewed from the direction shown by arrow III.

FIG. 4 is a diagram schematically showing a pressing force produced by thermal expansion.

DESCRIPTION OF EMBODIMENTS

In the following, a cooking device according to an embodiment of the present invention will be described. In the following description of the embodiment, the same or corresponding parts in the figures are denoted with the same reference signs, and a description thereof will not be repeated.

Figure 1:
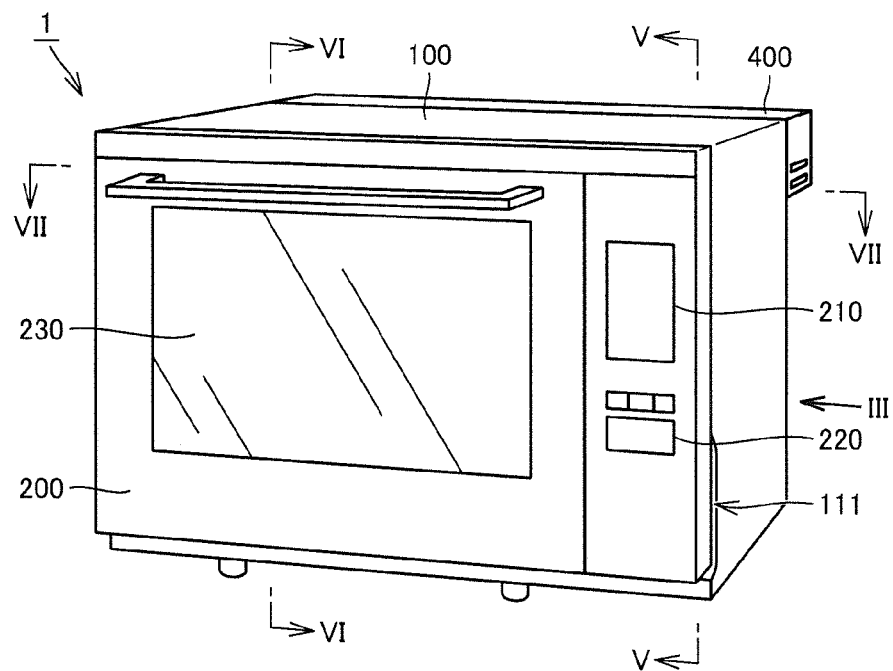
FIG. 1 is a perspective view showing an appearance of a cooking device according to an embodiment of the present invention.
Figure 2:
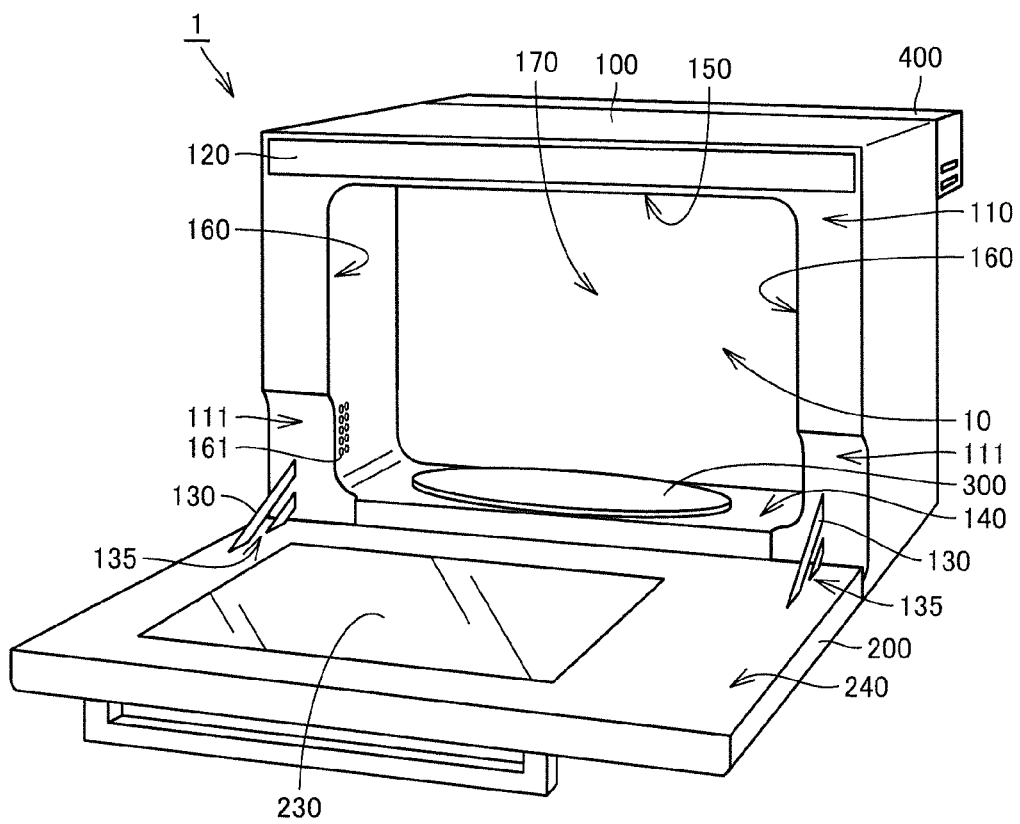
FIG. 2 is a perspective view showing the cooking device according to the embodiment with a heat insulation door opened.

FIG. 1 is a perspective view showing an appearance of a cooking device according to an embodiment of the present invention. FIG. 2 is a perspective view showing the cooking device according to the embodiment with a heat insulation door opened. FIG. 3 shows the cooking device in FIG. 1 as viewed from the direction shown by arrow III.

As shown in FIGS. 1 to 3, a cooking device 1 according to an embodiment of the present invention includes a box 100 having an opening on the front, and a heating chamber 10 provided in box 100 and inside which an object to be cooked is placed through the opening. The opening on the front of box 100 is positioned at an end on the front side of heating chamber 10.

Heating chamber 10 is surrounded with a top surface 150, a bottom surface 140, left and right side surfaces 160, and a back surface 170. A tray 300 is arranged inside heating chamber 10. Specifically, tray 300 is arranged on bottom surface 140 of heating chamber 10. An object to be cooked is put on tray 300.

Under box 100, an antenna 311 is arranged for supplying high frequency for heating an object to be cooked in heating chamber 10. A motor cover 310 is provided for accommodating a motor for rotating the antenna 311. The heating device is not limited to a high-frequency heating device and may be a heater, for example.

On the front side of box 100, a heat insulation door 200 is provided for closing the opening such that it can be opened/closed. That is, heating chamber 10 is opened/closed with heat insulation door 200. In the present embodiment, heat insulation door 200 is coupled to a lower portion on the front side of the box so as to be opened vertically to the opening.

Specifically, the lower portion of the side of box 100 is coupled with a coupling section 135 provided on an inner surface 240 of heat insulation door 200 by a hinge. It is noted that heat insulation door 200 may be coupled to an upper portion on the front side of the box.

As shown in FIG. 3, the hinge is formed with a rotation shaft 131, a bearing 132 supporting rotation shaft 131, and a support 130 pivotally supported on rotation shaft 131. Bearing 132 is provided at the lower portion of the side of box 100.

One end of support 130 is coupled with coupling section 135. Support 130 is pivotally supported so as to be pivotable about rotation shaft 131. With heat insulation door 200 closed, the other end of support 130 abuts on the lower portion of the side of box 100.

Heat insulation door 200 is provided with a display unit 210 for displaying a temperature in heating chamber 10, cooking conditions, and the like. Heat insulation door 200 is also provided with an operation unit 220 to which the user of cooking device 1 enters cooking conditions. Display unit 210 and operation unit 220 are connected to a controller arranged in part of box 100.

Heat insulation door 200 is further provided with a widow 230 to make the inside of heating chamber 10 visible from the outside of cooking device 1. Window 230 is formed of a heat-insulating transparent material.

Above the opening of box 100, a sensor unit 120 is provided, which comes into contact with inner surface 240 of heat insulation door 200 for sensing opening/closing of heat insulation door 200. Sensor unit 120 is connected to the controller. While sensor unit 120 is sensing the open state of heat insulation door 200, cooking device 1 is controlled by the controller such that it cannot operate.

At the upper portion of the back surface of box 100, a fan cover 400 is provided for covering a fan as an air blower mechanism. Fan cover 400 has a plurality of openings for taking in outside air. The fan is provided in box 100 for blowing outside air for cooling electronic components arranged on the periphery of heating chamber 10.

In cooking device 1 according to the present embodiment, a gap 111 having a predetermined space is present at the lower side between box 100 and heat insulation door 200 with heat insulation door 200 closed. That is, gap 111 is formed at the lower portion on the front side of the side of box 100 that faces inner surface 240 of heat insulation door 200.

Gap 111 is provided, for example, by adjusting the length of support 130 when box 100 and heat insulation door 200 are coupled by the hinge. A predetermined space of gap 111 is, for example, about 0.8 mm, although gap 111 is shown in an enlarged size in the drawings to provide a clear view.

Box 100 has an aperture section 161 on the side for introducing outside air blown by the fan into heating chamber 10. In the present embodiment, aperture section 161 is constituted with a plurality of punched holes formed on side surface 160 of heating chamber 10. Aperture section 161 is positioned adjacent to gap 111 on the side surface of heating chamber 10.

As shown in FIG. 3, let the length of box 100 in a state before a vapor generation device operates be $W_0$. Here, let the distance between the center of rotation shaft 131 and coupling section 135 be $L_0$.

FIG. 4 is a diagram schematically showing a pressing force produced by thermal expansion. As shown in FIG. 4, box 100 heated by operation of the heating device expands to a length of $W_1$.

On the other hand, the distance between the center of rotation shaft 131 and coupling section 135 becomes $L_1$ due to expansion of support 130 of the hinge heated by operation of the heating device. Since support 130 of the hinge is shorter than box 100, $(L_1-L_0)$ is smaller than $(W_1-W_0)$.

Being supported on coupling section 135, heat insulation door 200 may be opened in response to the pressing force caused by thermal expansion of box 100 in the direction shown by arrow 101, at the upper portion of inner surface 240 of heat insulation door 200. The pressing force is produced by the difference between $(L_1-L_0)$ and $(W_1-W_0)$.

If heat insulation door 200 receives the pressing force from box 100 at a position immediately above coupling section 135 to produce a slight gap between box 100 and heat insulation door 200 at a position on the central side of the radius of pivot of heat insulation door 200, a relatively large gap is produced at a position on the front end side of the radius of pivot of heat insulation door 200.

In this case, a gap is formed between sensor unit 120 and inner surface 240 of heat insulation door 200. Sensor unit 120 then senses the open state of heat insulation door 200 so that cooking device 1 cannot operate.

Cooking device 1 according to the present embodiment, then, has gap 111 formed at the lower portion on the front side of the side of box 100. Gap 111 is formed in a range that includes a position facing coupling section 135 of heat insulation door 200 and a position thereabove. Gap 111 between box 100 and heat insulation door 200 has a predetermined space larger than the length of thermal expansion of box 100 caused by operation of the heating device.

By doing so, gap 111 can absorb the effect of thermal expansion of box 100 and prevent heat insulation door 200 from opening due to thermal expansion of box 100. As a result, cooking device 1 can operate stably. The predetermined space of gap 111 may be shorter than the thermal expansion length of box 100. Also in this case, the effect of thermal expansion of box 100 can be reduced, and the opening of heat insulation door 200 can be prevented.

Gap 111 between box 100 and heat insulation door 200, however, may produce a problem that vapor leaks through gap 111 when vapor is produced in heating chamber 10.

Cooking device 1 according to the present embodiment, then, has aperture section 161 at a position adjacent to gap 111 on the side surface of heating chamber 10. The operation of aperture section 161 is described below.

Figure 5:
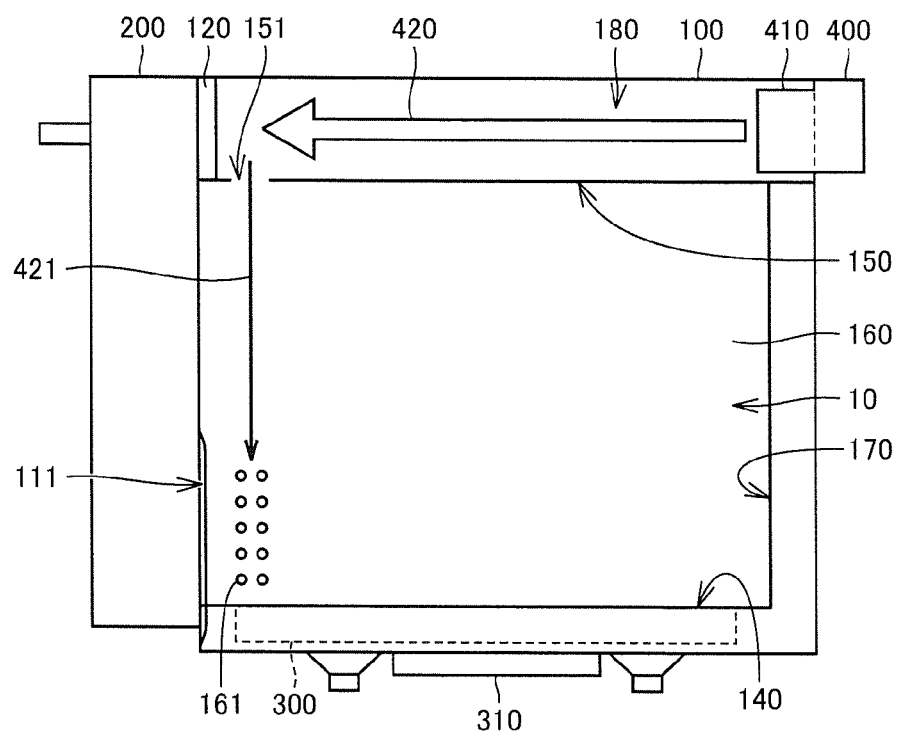
FIG. 5 is a view from the direction of arrow V-V in FIG. 1.
Figure 6:
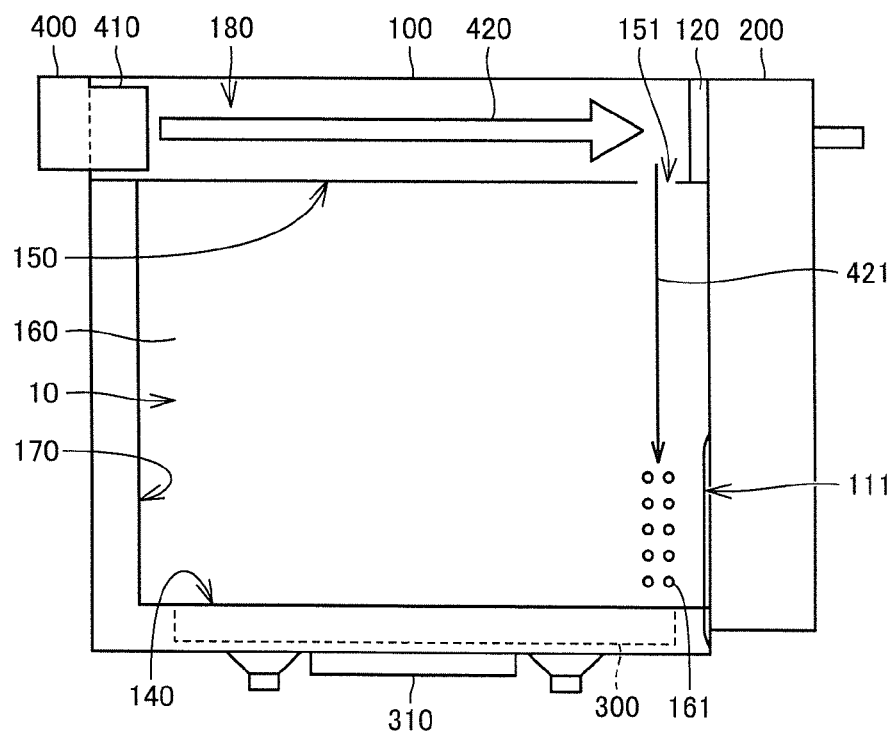
FIG. 6 is a view from the direction of arrow VI-VI in FIG. 1.
Figure 7:
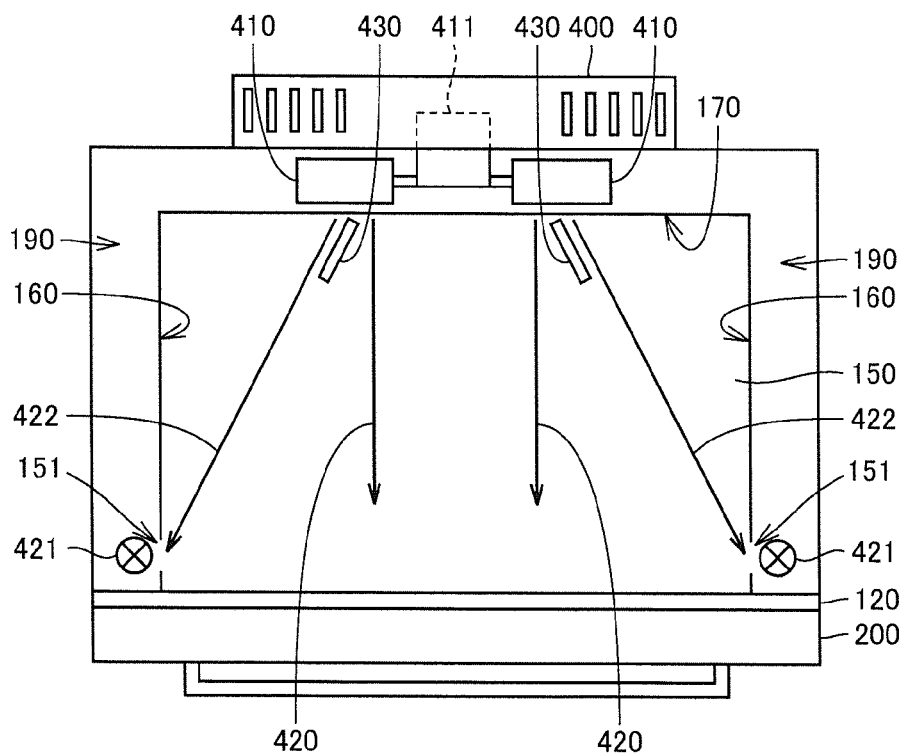
FIG. 7 is a view from the direction of arrow VII-VII in FIG. 1.
Figure 8:
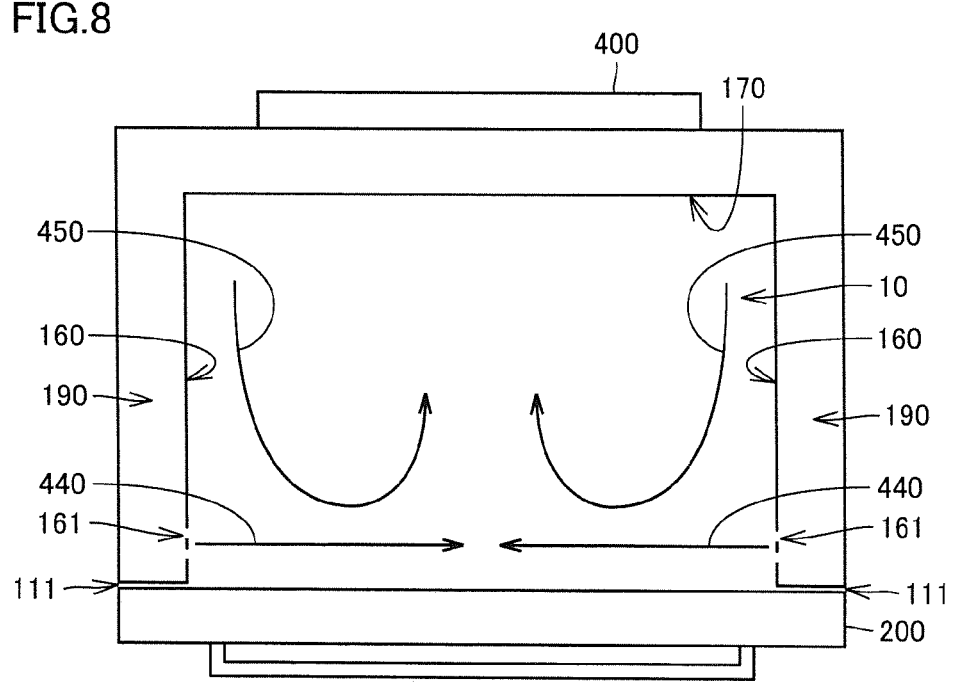
FIG. 8 is a cross-sectional view schematically showing the flow of vapor and air in a heating chamber as viewed from above.

FIG. 5 is a view from the direction of arrow V-V in FIG. 1. FIG. 6 is a view from the direction of arrow VI-VI in FIG. 1. FIG. 7 is a view from the direction of arrow VII-VII in FIG. 1. FIG. 8 is a cross-sectional view schematically showing the flow of vapor and air in the heating chamber as viewed from above. FIGS. 5 to 8 show the configuration of only part of cooking device 1 for the sake of brevity.

As shown in FIGS. 5 to 7, box 100 has a space communicatively connected above top surface 150 of heating chamber 10 and outside side surfaces 160. An upper space 180 positioned above top surface 150 of heating chamber 10 and a side space 190 positioned outside both side surfaces 160 of heating chamber 10 are connected through vent holes 151. Two vent holes 151 are each formed above aperture section 161.

A pair of fans 410 are provided on the back side of upper space 180 of box 100. A motor 411 for driving a pair of fans 410 is arranged between a pair of fans 410. Motor 411 is connected to each of a pair of fans 410.

Motor 411 drives a pair of fans 410 to introduce outside air into upper space 180 of box 100 through a plurality of openings of fan cover 400. Not-shown electronic equipment is arranged in upper space 180 of box 100.

The outside air blown from a pair of fans 410 in the direction shown by arrow 420 is ventilated from the back side toward the front side of box 100 in upper space 180 while cooling the electronic equipment. In front of each of a pair of fans 410, a deflection plate 430 as a deflector is arranged.

The blown outside air is therefore partially ventilated in the direction shown by arrow 422 along deflection plate 430 toward vent hole 151. In other words, deflection plate 430 is arranged to allow part of the outside air to be directed toward vent hole 151. When the deflector is not shaped like a plate, the deflector has such a shape that allows part of the outside air to be directed toward vent hole 151. It is noted that the deflector may not necessarily be provided.

The outside air passing through vent hole 151 from the inside of upper space 180 of box 100 to the inside of side space 190 is ventilated in the direction shown by arrow 421. The outside air, ventilated from the top surface 150 side to the bottom surface 140 side of box 100 in side space 190, reaches aperture section 161. The outside air reaching aperture section 161 flows into heating chamber 10 through aperture section 161.

As shown in FIG. 8, the outside air introduced into heating chamber 10 through aperture section 161 moves so as to traverse the opening of box 100 in the direction shown by arrow 440. An air curtain is then formed with the outside air introduced from aperture section 161, in heating chamber 10 on the inside of gap 111 between box 100 and heat insulation door 200.

Vapor produced from an object being cooked then moves as shown by arrow 450 and is blocked from leaking to the outside of heating chamber 10 through gap 111. As a result, vapor leakage from gap 111 is prevented from condensing around the periphery of cooking device 1 to cause a problem of contamination or corrosion. Since vapor produced from an object being cooked is prevented from adhering to and condensing on window 230 of heat insulation door 200, visibility of the inside of heating chamber 10 can be kept even during cooking.

In particular, in a built-in type cooking device that is used such that box 100 is installed with its periphery covered, the effect of preventing contamination or corrosion of the cover is significant because the cover is positioned in proximity to gap 111.

In a case where gap 111 is formed at the upper portion of box 100 or heat insulation door 200, fan 410 blows the outside air to the lower portion of box 100. Since vent hole 151 is also provided at the lower portion of box 100, the outside air passing through vent holes 151 is introduced into heating chamber 10 through aperture section 161. This configuration also achieves the same effect.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 cooking device, 10 heating chamber, 100 box, 111 gap, 120 sensor unit, 130 support, 131 rotation shaft, 132 bearing, 135 coupling section, 140 bottom surface, 150 top surface, 151 vent hole, 160 side surface, 161 aperture section, 170 back surface, 180 upper space, 190 side space, 200 heat insulation door, 210 display unit, 220 operation unit, 230 window, 240 inner surface, 300 turn table, 310 motor cover, 400 fan cover, 410 fan, 411 motor, 430 deflection plate.

The invention claimed is:

1. A cooking device comprising:
   a box having an opening on a front thereof;
   a heating chamber provided in said box and inside which an object to be cooked is placed through said opening;
   a door for opening and closing said opening;
   a heating device for heating the object in said heating chamber; and
   an air blower mechanism provided in said box for blowing outside air to the periphery of said heating chamber for cooling, wherein
   said door is pivotably coupled to a lower portion or an upper portion on a front side of said box so as to be opened vertically to said opening,
   a gap having a predetermined space is present at the lower portion or at the upper portion between said box and said door with said door closed, wherein said gap has said predetermined space larger than a length of thermal expansion of said box caused by heating with said heating device, wherein said length of thermal expansion of said box is a range along a side of the box that includes a position that faces a coupling section of the door,
   said box has an aperture section on a side thereof for introducing the outside air blown by said air blower mechanism into said heating chamber,
   said aperture section is positioned adjacent to said gap on a side surface of said heating chamber, and
   the outside air introduced into said heating chamber through said aperture section moves so as to traverse said opening to block vapor produced from the object by heating with said heating device from leaking through said gap to outside of said heating chamber.

2. The cooking device according to claim 1, wherein the cooking device is of a built-in type that is used such that said box is installed with its periphery covered.

3. A cooking device comprising:
   a box having an opening on a front thereof;
   a heating chamber provided in said box and inside which an object to be cooked is placed through said opening;

a door for opening and closing said opening;

a heating device for heating the object in said heating chamber; and an air blower mechanism provided in said box for blowing outside air to the periphery of said heating chamber for cooling, wherein said door is pivotably coupled to a lower portion or an upper portion on a front side of said box so as to be opened vertically to said opening, a gap having a predetermined space is present at the lower portion or at the upper portion between said box and said door with said door closed, said box has an aperture section on a side thereof for introducing the outside air blown by said air blower mechanism into said heating chamber, said aperture section is positioned adjacent to said gap on a side surface of said heating chamber, the outside air introduced into said heating chamber through said aperture section moves so as to traverse said opening to block vapor produced from the object by heating with said heating device from leaking through said gap to outside of said heating chamber, said air blower mechanism includes a fan for blowing outside air and a deflector for deflecting the outside air blown from the fan, and said deflector has such a shape that deflects the outside air blown by said fan to the upper portion or the lower portion of said box toward the side of said box and guides the outside air to said aperture section.

4. The cooking device according to claim 3, wherein the cooking device is of a built-in type that is used such that said box is installed with its periphery covered.

\* \* \* \* \*